(12) United States Patent
Nakagawa

(10) Patent No.: US 7,622,896 B2
(45) Date of Patent: Nov. 24, 2009

(54) BATTERY CHARGING CONTROL TERMINAL AND TEMPERATURE CONTROL TERMINAL

(75) Inventor: Takao Nakagawa, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 11/172,853

(22) Filed: Jul. 5, 2005

(65) Prior Publication Data

US 2006/0001405 A1    Jan. 5, 2006

(30) Foreign Application Priority Data

Jul. 2, 2004   (JP)   .............................. 2004-196748

(51) Int. Cl.
*H02J 7/04*   (2006.01)
*H02J 7/16*   (2006.01)

(52) U.S. Cl. .................... 320/150; 320/153; 320/160

(58) Field of Classification Search ................. 320/149, 320/150, 153, 134, 160; 455/405
See application file for complete search history.

(56) References Cited

U.S. PATENT DOCUMENTS

| | | | | |
|---|---|---|---|---|
| 5,456,870 A | * | 10/1995 | Bulgrin | 264/40.6 |
| 5,563,496 A | * | 10/1996 | McClure | 320/128 |
| 5,637,982 A | * | 6/1997 | Nanno et al. | 320/150 |
| 5,904,902 A | * | 5/1999 | Matuoka et al. | 422/174 |
| 5,906,614 A | * | 5/1999 | Stern et al. | 606/42 |
| 6,114,839 A | * | 9/2000 | Takano et al. | 320/150 |
| 6,118,255 A | * | 9/2000 | Nagai et al. | 320/152 |
| 6,212,644 B1 | | 4/2001 | Shimoda et al. | |
| 6,286,109 B1 | | 9/2001 | Pirdy | |
| 6,557,072 B2 | * | 4/2003 | Osborn | 711/106 |
| 6,936,995 B2 | * | 8/2005 | Kapsokavathis et al. | 320/132 |
| 6,982,860 B2 | * | 1/2006 | Smith et al. | 361/119 |
| 2001/0014049 A1 | | 8/2001 | Woo et al. | |
| 2002/0099514 A1 | | 7/2002 | Watts, Jr. | |
| 2002/0169924 A1 | | 11/2002 | Osborn | |
| 2003/0100340 A1 | | 5/2003 | Cupps et al. | |
| 2005/0017691 A1 | * | 1/2005 | Aradachi et al. | 320/150 |
| 2005/0258806 A1 | * | 11/2005 | Janik et al. | 320/155 |
| 2006/0164111 A1 | * | 7/2006 | Lopez et al. | 324/760 |

FOREIGN PATENT DOCUMENTS

| | | |
|---|---|---|
| CN | 1361464 A | 7/2002 |
| EP | 0 785 496 A1 | 7/1997 |
| JP | 8-149711 A | 6/1996 |
| JP | 2000278878 A | 10/2000 |
| JP | 2002-218026 A | 8/2002 |

* cited by examiner

*Primary Examiner*—Edward Tso
*Assistant Examiner*—Arun Williams
(74) *Attorney, Agent, or Firm*—Sughrue Mion, PLLC

(57) ABSTRACT

The future intra-terminal temperature is estimated on the basis of present intra-terminal temperature and a present service state of the terminal. In addition, the charging of the battery unit is controlled on the basis of the estimated future intra-terminal temperature.

20 Claims, 6 Drawing Sheets

BATTERY CHARGING CONTROL TERMINAL AND TEMPERATURE CONTROL TERMINAL

BACKGROUND OF THE INVENTION

1. Field of the Invention

The present invention relates to a communication device, such as a communication terminal and a method of controlling its heat generation, and in particular, to a communication terminal equipped with a function of preventing overheat in the whole or a part of portable communication terminal, and a method of controlling its heat generation.

2. Description of the Related Art

In recent years, a problem which has arisen easily is that the surface temperature and internal temperature of a portable communication terminal becomes high at the time of charging of a videophone or the like in a heavy load state, with the miniaturization and effort-to-high-performance of the portable communication terminal. Here, in order to prevent the temperature rise of a portable communication terminal, it is necessary to remove a cause of heat generation. As conventional method of controlling charging heat generation, a method of stopping charging at the time of high temperature detection and a method of performing charge control by the present temperature of a battery or a terminal are proposed. However, the former method has a problem that charging operation stops. In order to solve this problem, the method of implementing a measure against charging heat generation at apparatus temperature is necessary.

Then, in order to implement the measure against the charging heat generation at the apparatus temperature, a portable communication terminal equipped with a battery charger which prevents the excessive heat generation of a battery is described in, for example, Japanese Patent Laid-Open No. 8-149711. In a battery charger which calculates the internal temperature of a battery on the basis of the detection result of first temperature detected inside a battery pack, and second temperature detected within the battery charger, measures the time elapsed from a charging start, determines a rise rate per unit time of temperature inside the above-mentioned calculated internal temperature of the battery when measuring time becomes predetermined time, and ends charging when the rise rate exceeds a reference value, this battery charger has the structure of selecting the predetermined time until determining the internal temperature rise rate of the battery, on the basis of the first and second temperature detection results at the time of the charging start.

The portable communication terminal equipped with this battery charger determines a termination of charging according to the internal temperature rise rate of the battery, can correct the time until an temperature rise rate is measured, and the reference value of the temperature rise rate according to the remaining heat of last charging, environmental temperature, and a type of the battery, and a heating value of the battery, and suppresses the excessive heat generation of the battery by eliminating the excess and deficiency of charging.

Thus, the conventional portable communication terminal equipped with the above-mentioned battery charger controls heat generation by controlling the charging of the battery according to the measured present temperature and present temperature rise rate based on the temperature within the terminal.

Another conventional portable communication terminal equipped with a battery charger is described in Japanese Patent Laid-Open No. 2002-218026. This portable communication terminal reduces charging current by a constant value if it has a call during charging. This terminal solves the problem that heat generation increases during charging with a call comparing to during only charging.

SUMMARY OF THE INVENTION

An object of the present invention is to improve conventional control of the heat generation of a portable communication terminal, that is, to implement adequate control of the heat generation by preventing unnecessary charge control in the terminal where various service states and situations exist, and the like.

In order to achieve the above-mentioned objects, the present invention provides a communication terminal which operates by a power supply from a battery unit charged by a battery charger, comprising: intra-terminal temperature estimation means which estimates future intra-terminal temperature on the basis of present intra-terminal temperature, and a present service state of the terminal; and charge control means which controls charging of the battery unit on the basis of the future intra-terminal temperature estimated by the intra-terminal temperature estimation means.

In addition, the present invention provides a method of controlling heat generation of a communication terminal which operates by a power supply from a battery unit charged by a battery charger, comprising: a step of estimating future intra-terminal temperature on the basis of present intra-terminal temperature, and a present service state of the terminal; and a step of controlling charging of the battery unit on the basis of the future intra-terminal temperature estimated.

In addition, the present invention provides a communication terminal which operates by a power supply from a battery unit charged by a battery charger, comprising charge control means which, if the terminal is using at least one of predetermined functions during charging, changes a value of reduction of charging current during the charging on the basis of the predetermined functions which the terminal is using.

In addition, the present invention provides a method of controlling heat generation of a communication terminal which operates by a power supply from a battery unit charged by a battery charger, comprising a step of, if the terminal is using at least one of predetermined functions during charging, changing a value of reduction of charging current during the charging on the basis of the predetermined function which the terminal is using.

According to the present invention, it is possible to prevent excessive heat generation by charging with maintaining charging operation every apparatus state effectively, and to prevent an accident, such as a burn, and a failure of a cellular phone terminal by heat generation since it is made to control the charging of a battery unit by a battery charger every setup time of estimated apparatus temperature on the basis of the estimated apparatus temperature after the setup time beforehand determined from a charging start.

In addition, according to the present invention, it is possible to control the charging adequately according to the various state of the terminal, since it is made to change the reduction in charging current according to the terminal using function.

DETAILED DESCRIPTION OF THE PREFERRED EMBODIMENTS

Figure 1:
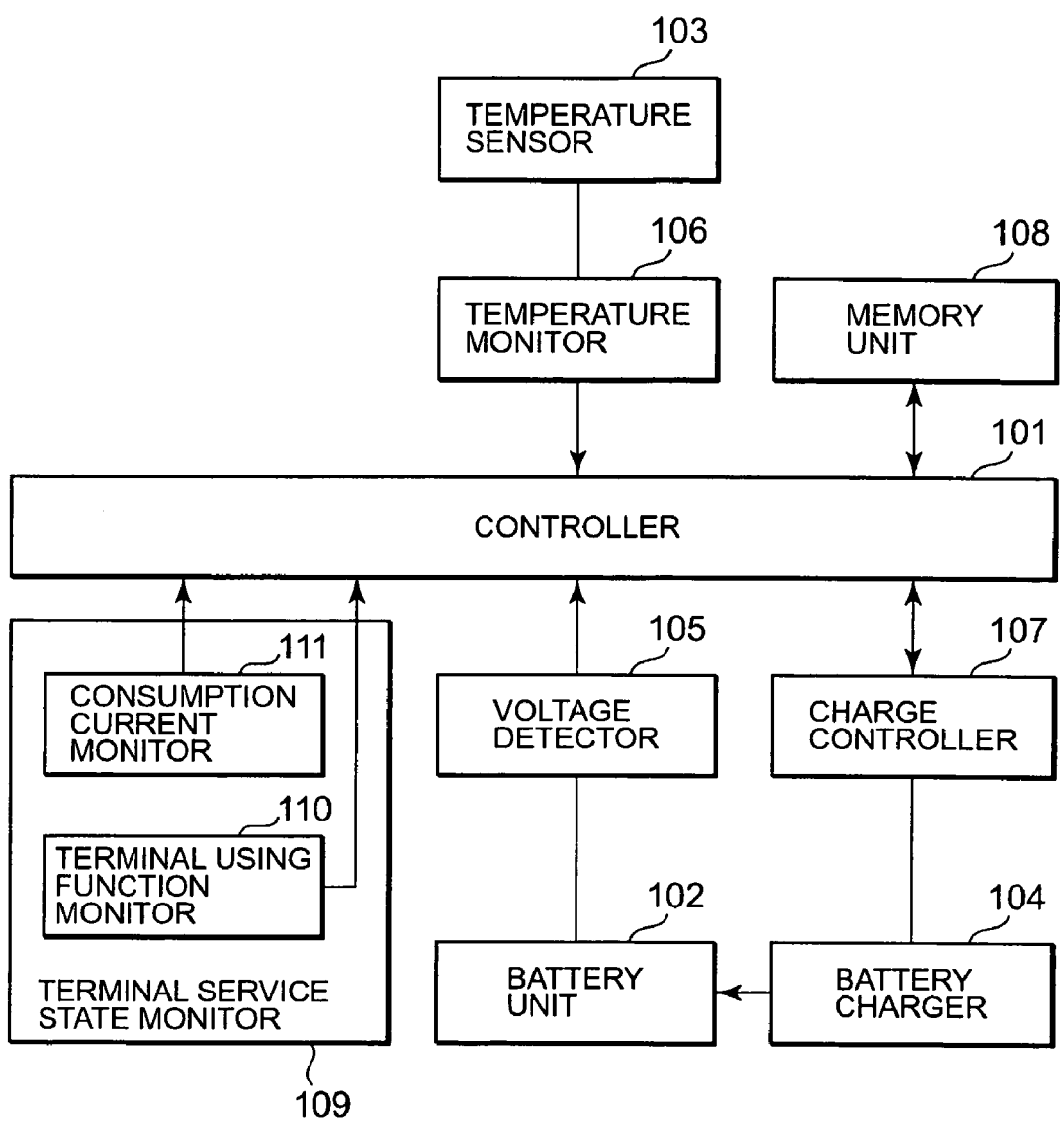
FIG. 1 is a block diagram of a principal part of an embodiment of the present invention.

Next, preferable embodiments for implementing the present invention will be described with drawings. FIG. 1 shows a block diagram of an embodiment of a principal part of a communication terminal of the present invention. In this diagram, a communication terminal of this embodiment is a cellular phone terminal, which is constituted of a controller 101 which controls the whole terminal totally, a battery unit 102 which generates a power supply of the terminal, a temperature sensor 103 which detects intra-terminal temperature, a battery charger 104 which charges the battery unit 102, a temperature monitor 106 which monitors the detection temperature of the temperature sensor 103, a charge controller 107 which controls a charging state by the battery charger 104, a memory unit 108 which holds control information according to each estimation temperature, and a terminal service state monitor 109 which monitors a terminal service state. The terminal service state monitor 109 is constituted of at least one of, for example, a voltage detector 105 which detects the battery residue of the battery unit 102, a service function monitor 110 which monitors a function which the terminal is using now, and a consumption current monitor 111 which monitors a consumption current within the terminal. In addition, the terminal service state monitor 109 has a function of monitoring a service state of the terminal which is other than this so long as it is a function of monitoring the service state of the terminal.

Figure 4:
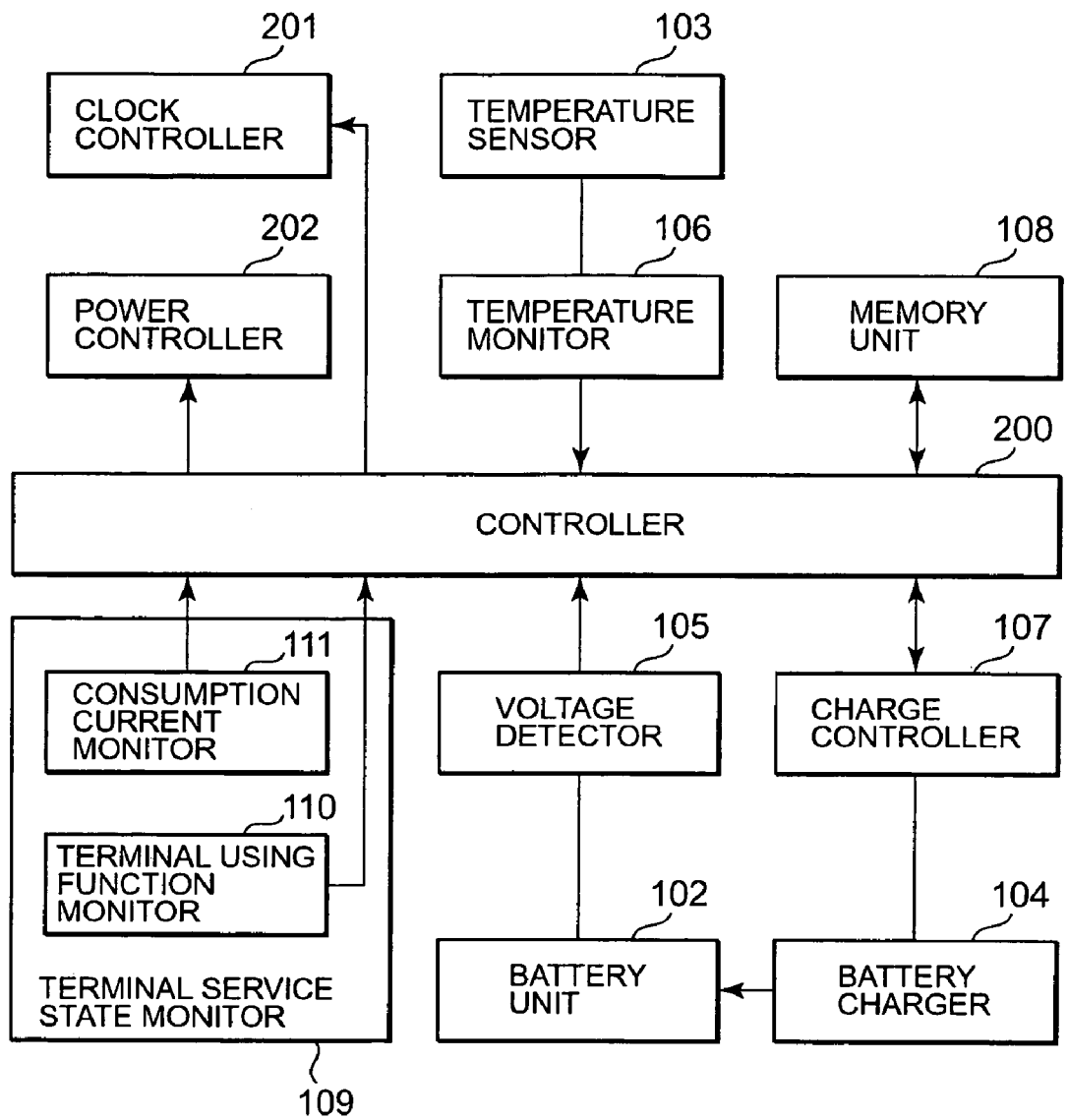
FIG. 4 is a block diagram of a principal part of another embodiment of the present invention.

FIG. 1 shows only the blocks directly relating to this embodiment, and publicly-known fundamental blocks in a cellular phone terminal, for example, a keyboard input unit for performing necessary inputs of a phone number, a mail sentence, and the like, a loud speaker of sounding a ringer tone and received speech, a microphone which converts transmission speech into a speech signal, a radio for communicating between with a nearby base station, a display unit which displays a variety of information, and a controller which is connected to these blocks and controls the operation of these blocks (the controller 101 can be also acted for this) are not shown (below-mentioned FIG. 4 is also the same).

Figure 2:
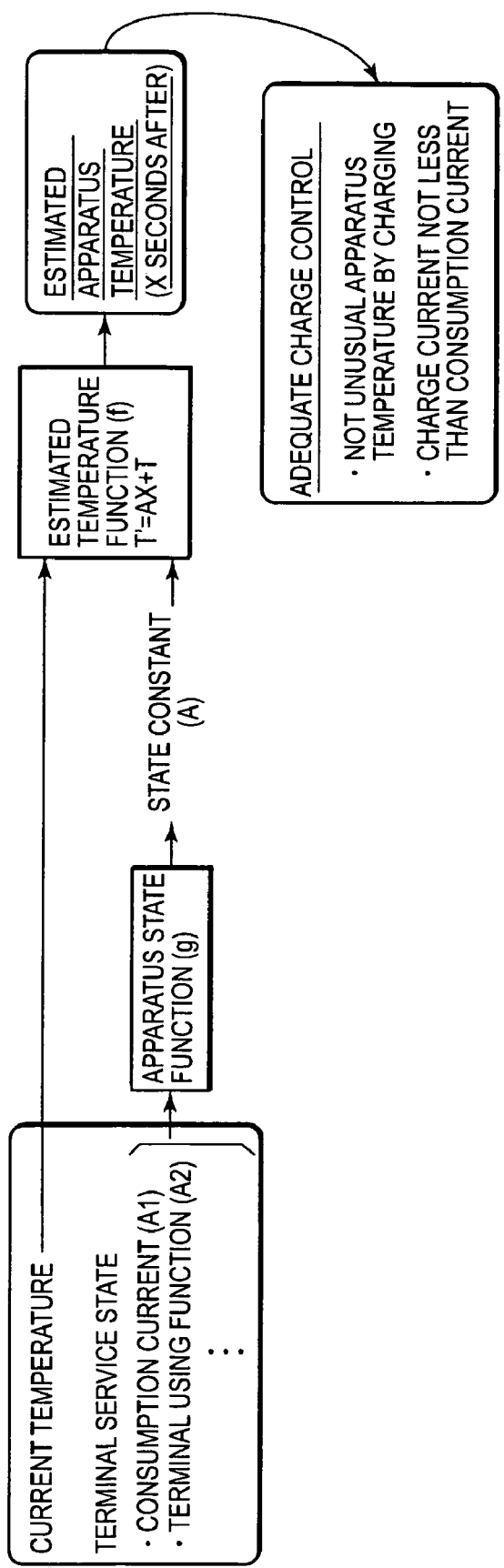
FIG. 2 is an explanatory operation diagram of an example from a present apparatus state to the implementation of adequate charge control according to an embodiment of the present invention.

A preferred implementation of adequate charge control based on a present apparatus state according to this embodiment will be explained with referring to FIG. 2. In FIG. 2, the future temperature of the cellular phone terminal is estimated from a present service state of the terminal. The service state of the terminal is the present state of the terminal, which plays a role of the parameter that enables us to estimate the future temperature of the terminal; such as a consumption current (A1) of the terminal and a terminal using function (A2). The terminal using function means the function which the terminal is using.

For example, a state constant (A) is calculated from a present service state of the terminal using a terminal state function (g). In addition to that, an estimated apparatus temperature for the future (e.g. after X seconds) (T') is calculated from the state constant (A) and a present temperature of the terminal (T), using an estimated temperature function (f). This embodiment implements adequate charge control by using this estimated apparatus temperature, that is, the estimated temperature in the cellular phone terminal. The adequate charge control is the charging fulfilling the conditions such as "apparatus temperature does not become unusual by charging" and "a charge current exceeds a consumption current." The meaning of "apparatus temperature does not become unusual" is, for example, that the apparatus temperature does not exceed a predetermined value. The predetermined value may be constant, and also may be variable to charging time.

Next, how to estimate the state constant (A) from the service state of the terminal will be described.

As for the consumption current (A1), the heating value is nearly proportional to a consumption current of the whole terminal. When the consumption current becomes large, the heating value also increases in proportion to it, and intra-terminal temperature also increases according to it. Therefore, if the constant of the heating value to the consumption current is predetermined, the state constant (A) will be estimated directly.

As for the terminal using function (A2), a consumption current is mostly determined according to the service function. So consumption current of the whole terminal will be estimated from the service functions indirectly. Consequently, the state constant will be estimated from the service function. The service state of the terminal is not limited to the consumption current and the terminal using function.

The present invention controls charging according to various service states and situations of the terminal in this way. Thereby, it is possible to prevent unnecessary charge control and to implement the adequate measure against heat generation.

In addition, since not only the present temperature information but future temperature are estimated and controlled, it is possible further to prevent the delay of control.

Furthermore, it is possible adequately to estimate future temperature according to various service states and situations of a terminal by estimating the temperature of the cellular phone terminal on the basis of not only the temperature information of the terminal but also terminal service state information, including the terminal using function or consumption current of the terminal.

Figure 3:
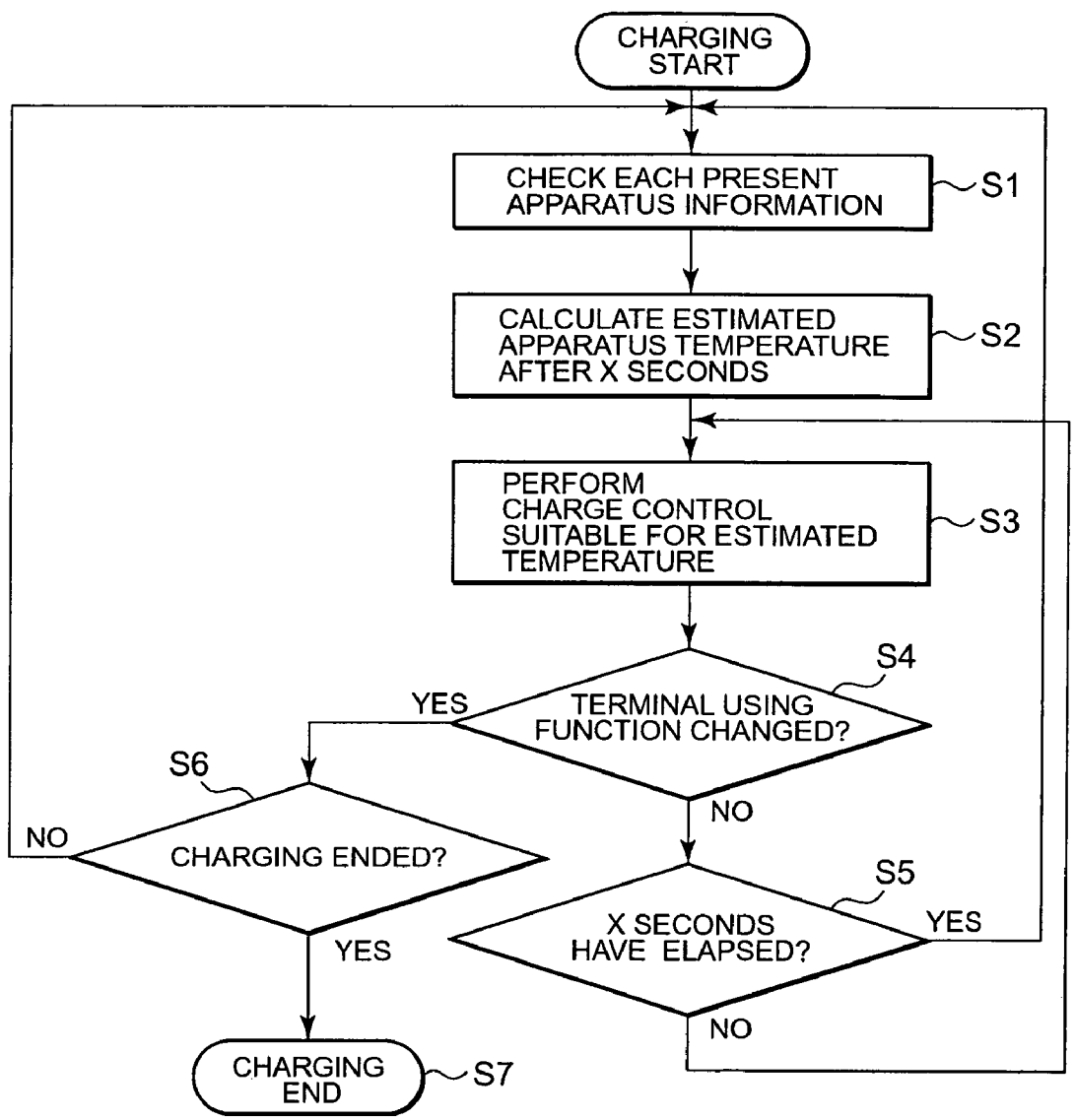
FIG. 3 is a flowchart explaining the operation of the present invention.

Next, a method of controlling heat generation due to charging in the embodiment of the portable communication terminal of the present invention in FIG. 1 will be described using the flowchart shown in FIG. 3. The controller 101 checks the present temperature (T) monitored by the temperature monitor 106, and the present battery residue detected by the voltage detector 105 while monitoring the present consumption current (A1) by the consumption current monitor 111, and checks the present cellular phone terminal information, including the present terminal using function (A2) by the terminal using function monitor 110 (step S1). Then, the controller 101 calculates the estimated apparatus temperature after a predetermined period (X seconds) by the method described with FIG. 2 (step S2).

Next, the controller 101 designates the charge controller 107 on the basis of the above-mentioned estimated apparatus temperature calculated. The charge controller 107 designated controls the charging of the battery unit 12 by the battery charger 14 (step S3). The designation to the charge controller 107 from the controller 101 may be performed on the basis of the information set beforehand in the memory unit 108. Here, the controller 101 monitors whether the terminal using function is changed during charge control on the basis of the service function monitor 110 and the like (step S4). If the terminal using function is not changed, the controller 101 determines whether X seconds have elapsed (step S5). If X seconds have not elapsed, the controller 101 implements charge control suitable for the above-mentioned estimated apparatus temperature after X seconds which is calculated (step S3). When X seconds have elapsed, the process returns to step S1 again.

On the other hand, when the apparatus state is changed, the controller 101 determines whether the charging ends (step S6). When the charging does not end, the controller 101 checks the present cellular phone terminal information again (step S1), calculates the estimated apparatus temperature after X seconds, and performs new charge control (S2 and S3). Here, whether the charging ends can be determined by whether the battery residue detected by the voltage detector 105 exceeds a predetermined value.

Here, in the above-mentioned time (X seconds) setting at the time of the estimated apparatus temperature calculation, a value every service function state before handset in the memory unit 108 can be used. It becomes possible to perform charge control effectively thereby. Specifically, the estimated apparatus temperature is calculated at short intervals at the time of charging in a heavy load state such as a state of using a videophone, and the estimated apparatus temperature is calculated at long intervals at the time of charging in a waiting state or the like. If plural different functions are used, it is preferable to apply the shortest of selected intervals. Thereby, it is possible to decrease the disagreement between the estimated apparatus temperature after X seconds and the present temperature.

In this way, according to this embodiment, the cellular phone terminal temperature after X seconds from a charging start is estimated from the present service state of a cellular phone terminal, such as a consumption current (A1), and a service function (A2) of the cellular phone terminal, and the present temperature (T) of the cellular phone terminal, and an amount of a charge current is controlled on the basis of the estimated temperature. Thereby, it is possible to prevent an accident, such as a burn, and a failure of the cellular phone terminal by heat generation with maintaining charging operation every apparatus state effectively.

Next, another embodiment of the present invention will be explained. FIG. 4 shows a block diagram of the other embodiment of a principal part of a portable communication terminal according to the present invention. In this figure, the same characters are assigned to the same components as those in FIG. 1, and description of them is omitted. In the embodiment shown in FIG. 4, not only a clock controller 201 which controls an operation clock of each module within a terminal, and a power controller 202 which controls a power supply of each module within the terminal are added to the embodiment in FIG. 1, but also a controller 200 performs the predetermined operation different from the operation of the controller 101 of the embodiment in FIG. 1.

In this embodiment, since the clock controller 201 and power controller 202 are added to the embodiment in FIG. 1, it is possible to perform effective control of heat generation by the limitation of available functions or the like besides the charge control from the estimated apparatus temperature and each apparatus information. In addition, because of clock control and power control also at the time of high temperature detection in a state of using a heavy load function except a charging state, it is possible to control a consumption current and to implement the control of heat generation. Here, what are available as specific examples of the above-mentioned function limitation are "to lower intensity levels of a display unit and the like", "to stop the lighting of LEDs", and the like. In addition, the LEDs include all the LEDs (for incoming call blinking, light sources of a back light, display of a display unit, and the like) used with the cellular phone terminal.

Thus, in this embodiment, it is possible to perform the control of heat generation effectively by restricting the available functions, that is, the decrease of intensity levels of a display unit and the like, the stop of lighting of light emitting diodes (LED) in the display unit, and the turning-off or lowering of brightness of the back light in the display unit at the time of high temperature detection in the state of using heavy load function except the charging state where the consumption current at the time of a videophone and the like is larger than the charge current.

In addition, depending on the load of service functions and the estimated apparatus temperature, it is also possible to limit not only a part of service functions but also all of them.

Figure 5:
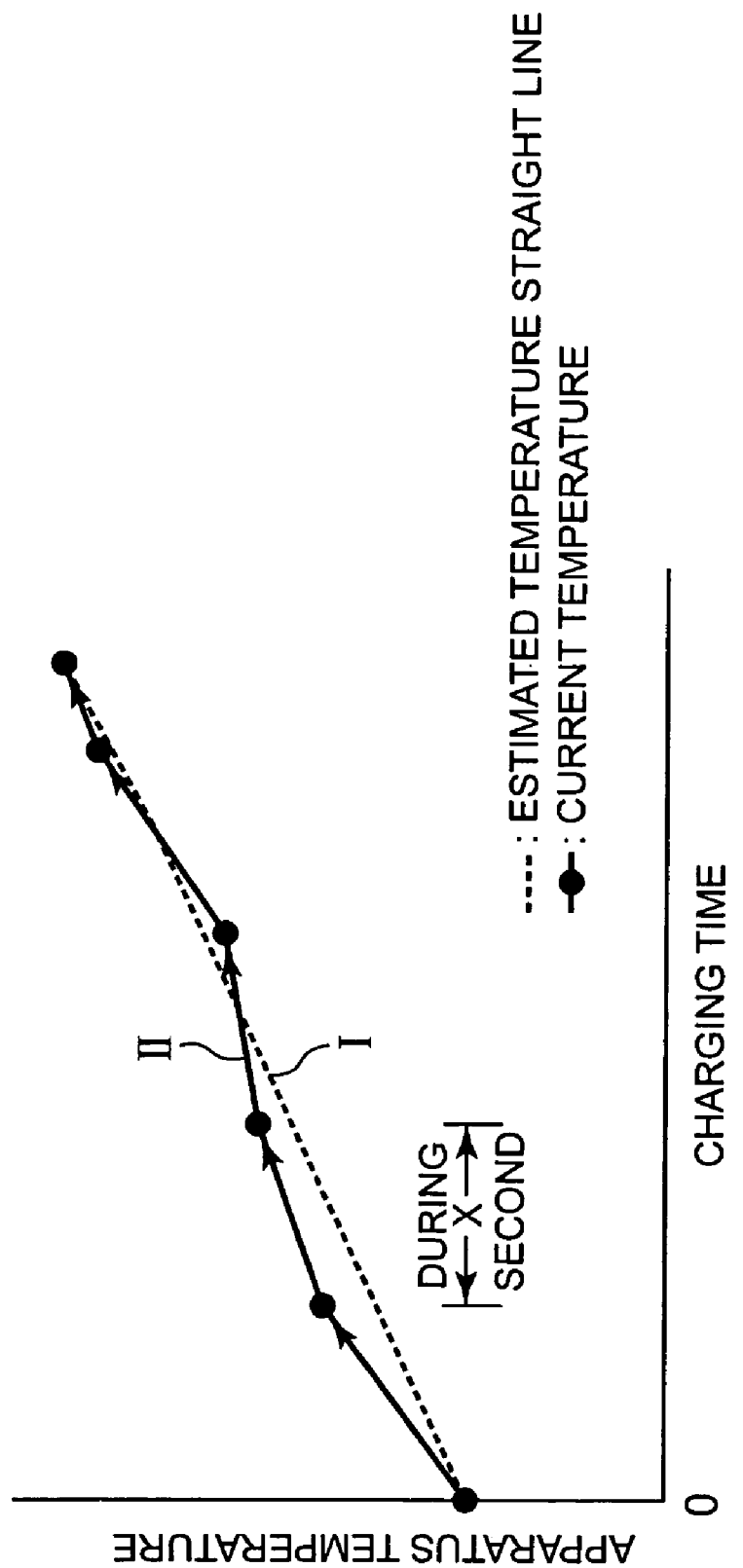
FIG. 5 is a graph showing the disagreement between the estimated apparatus temperature straight line and the present temperature by the control of the present invention.

FIG. 5 shows the method of controlling heat generation by the estimated apparatus temperature straight line as another example of the adequate charge control. In the embodiment shown in FIG. 5, the control of heat generation are implemented by performing the charge control using the estimated apparatus temperature straight line (or curve) in the past charging state shown by a dotted line I in a learning function of a cellular phone terminal. Thus, in this embodiment, charge control suitable for the estimated apparatus temperature after X seconds which was calculated on the basis of the terminal service state was implemented in the past, the charging state at that time was stored in the memory 108 every cellular phone terminal information, the past charging state stored in the memory 108 is read according to the present cellular phone terminal information, and the charge control is performed on the basis of it.

The dotted line I in FIG. 5 is the estimated temperature straight line (or curve) calculated from the above-mentioned past charging states. In this embodiment, a charge current is controlled according to the disagreement between the present temperature, shown by a continuous line II in FIG. 5, and the estimated apparatus temperature straight line (curve) I, and excessive heat generation of the cellular phone terminal is suppressed. For example, the charging can be controlled at the aim of the estimated temperature after X seconds from the measuring time of each of the present temperature.

Figure 6:
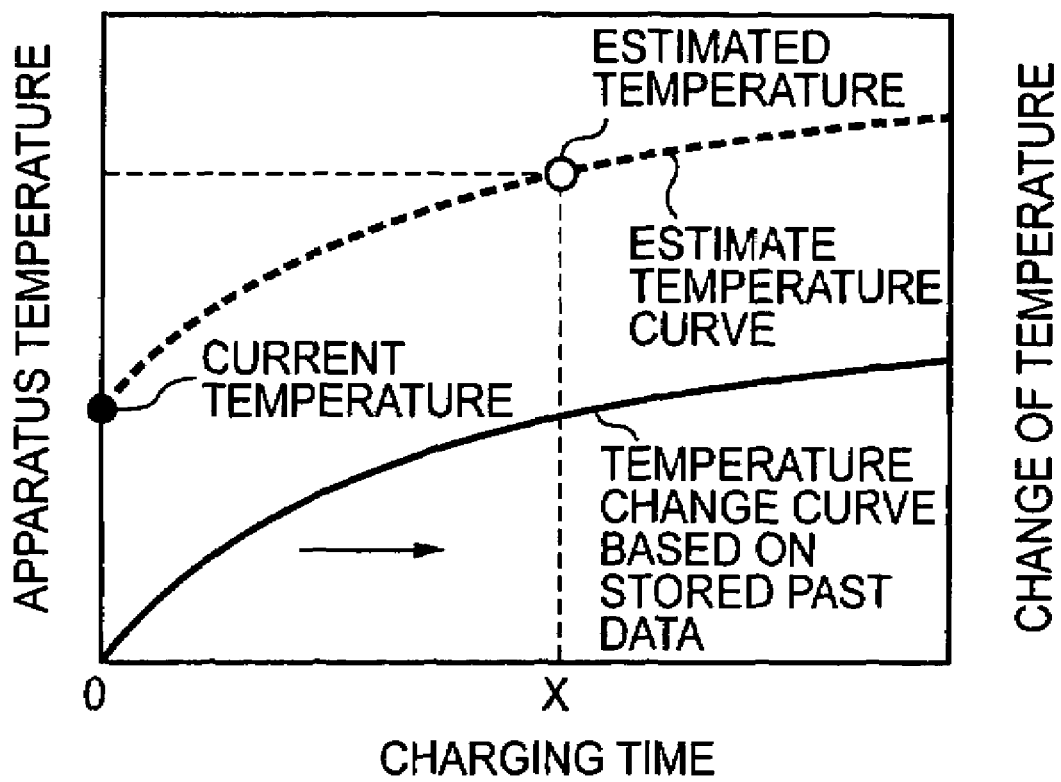
FIG. 6 is a graph explaining an example of the step for estimating a future intra-terminal temperature according to an embodiment of the present invention.

FIG. 6 is a graph explaining an example of the step for estimating a future intra-terminal temperature according to an embodiment of the present invention. In FIG. 2, the future temperature of the terminal is estimated by calculating the state constant (A) of the terminal based on the present terminal service state. On the other hand, this embodiment estimates a future temperature of the terminal based on the past temperature information of the terminal according to the present terminal service state. Thus, in this embodiment, charge control suitable for the estimated apparatus temperature after X seconds which was calculated on the basis of the terminal service state was implemented in the past, the charging state at that time was stored in the memory 108 every cellular phone terminal information, the past charging state stored in the memory 108 is read according to the present cellular phone terminal information, and the estimation of future temperature is performed on the basis of it. For example, the average of all of the past data according to the same state as the present state of the terminal is used for estimating a temperature value and temperature curve to the charging time. The memory 108 may store only the information on change of temperature. In such case, the estimated temperature can be obtained from the estimated temperature change curve complemented from past data as shown in FIG. 6. The dotted curve shows an estimated temperature curve which is offset by the present temperature. Thus, the terminal temperature after X seconds after the charging start or after the previous measurement can be estimated. The use of the past charging state data makes the estimation more real.

Next, another embodiment of the present invention will be explained. In this embodiment, if the terminal is using at least one of predetermined functions during charging, the charge controller 107 in FIG. 1 changes a value of reduction of charging current during the charging on the basis of the predetermined functions which the terminal is using.

More specifically, a memory means in FIG. 1 stores offset values each of which corresponds to each of the predetermined functions of the terminal. If the terminal is using at least one of the predetermined functions during charging, the controller 101 obtains an offset value which corresponds to the predetermined function which the terminal is using from the memory 108. Then, the controller sends the charge controller 107 the offset value information. Thus the charge controller 107 reduces the charging current by the offset value during the charging.

For example, the lager the consumption current of the predetermined function is, the lager the offset value is set. It is preferable that the offset value is set to be the same as the consumption current of the predetermined function of the terminal.

According to this embodiment, it is possible to control the charging adequately according to the various state of the terminal, since it is made to change the reduction in charging current according to the terminal using function.

In addition, the present invention is not restricted to the above embodiments, for example, the present invention can be applied widely to a general portable communication terminal which operates with a battery as a power supply, such as a Personal Digital Assistant (PDA) or the like except a cellular phone terminal. Furthermore, although intra-terminal temperature, a terminal using function and a consumption current of a terminal are used as various types of information of the cellular phone terminal used for the calculation of estimated apparatus temperature, the estimated apparatus temperature may be calculated using the arbitrary combination of two or more among them although accuracy drops. Furthermore, although being described as intra-terminal temperature, estimated temperature may be the temperature of a secondary cell (battery unit 12).

What is claimed is:

1. A communication device which operates by a power supply from a battery unit charged by a battery charger, comprising:
    intra-device temperature estimation means which estimates future intra-device temperature on the basis of present intra-device temperature and a present service state of the communication device; and
    charge control means which controls charging of the battery unit on the basis of the future intra-device temperature estimated by the intra-device temperature estimation means;
    wherein said present service state of the communication device is determined from at least a detected voltage and a consumption current.

2. The communication device according to claim 1, wherein the service state of the device includes states relating to at least one of a device using function, and a consumption current within the device.

3. The communication device according to claim 1, wherein the intra-device temperature estimation means estimates intra-device temperature after a predetermined setup time after starting charging, or after a device using function is changed.

4. The communication device according to claim 3, wherein the intra-device temperature estimation means repeatedly estimates intra-device temperature after the predetermined setup time whenever the predetermined setup time elapses after estimating the intra-device temperature after the predetermined setup time elapses.

5. The communication device according to claim 1, further comprising:
    memory means which stores one or more setup times corresponding to each of one or more predetermined functions, wherein, if the device is using at least one of the one or more predetermined functions, the intra-device temperature estimation means determines an estimated time on the basis of a setup time which corresponds to the one or more predetermined function, which the device is using, and is stored in the memory means, and estimates intra-device temperature after the estimated time after starting charging, or after the device using function is changed.

6. The communication device according to claim 1, wherein the charge control means controls charging of the battery unit lest the future intra-device temperature should become unusual by the charging and a charge current to the battery unit should become a present consumption current or less.

7. The communication device according to claim 1, further comprising:
    functional limitation means of limiting some or all of a function which is used now lest a charge current to the battery unit should become a present consumption current or less.

8. The communication device according to claim 1, further comprising:
    temperature information storage means of storing intra-device temperature information during past charging, wherein the intra-device temperature estimation means estimates future intra-device temperature on the basis of the present intra-device temperature, the present service state of the device and the intra-device temperature information stored in the temperature information storage means.

9. The communication device according to claim 1, further comprising:
    temperature information storage means of storing intra-device temperature information during past charging, wherein the intra-device temperature estimation means obtains a change of estimated temperature to charging time according to a service state of the device on the basis of the intra-device temperature information stored in the temperature information storage means, and estimates the future intra-device temperature on the basis of the present intra-device temperature and the obtained change of estimated temperature to charging time according to the service state of the device.

10. A method of controlling heat generation of a communication device which operates by a power supply from a battery unit charged by a battery charger, comprising:

estimating future intra-device temperature on the basis of present intra-device temperature and a present service state of the communication device; and controlling charging of the battery unit on the basis of the future intra-device temperature estimated;

wherein the present service state of the communication device is determined from at least a detected voltage and a consumption current.

11. The method of controlling heat generation of a communication device according to claim 10, wherein a service state of the device includes states relating to at least one of a device using function, and a consumption current within the device.

12. The method of controlling heat generation of a communication device according to claim 10, wherein the step of controlling charging comprises controlling charging lest the future intra-device temperature should become unusual by the charging and a charge current to the battery unit should become a present consumption current or less.

13. The method of controlling heat generation of a communication device according to claim 10, further comprising:

limiting some or all of a function which is used now lest a charge current to the battery unit should become a present consumption current or less.

14. The method of controlling heat generation of a communication device according to claim 10, wherein estimating future intra-device temperature comprises estimating future intra-device temperature on the basis of the present intra-device temperature, the present service state of the device, and intra-device temperature information stored in the device.

15. The method of controlling heat generation of a communication device according to claim 10, wherein estimating future intra-device temperature comprises obtaining a change of estimated temperature to charging time according to a service state of the device on the basis of the intra-device temperature information stored in the device, and estimating the future intra-device temperature on the basis of the present intra-device temperature and the obtained change of estimated temperature to charging time according to the service state of the device.

16. A method of controlling heat generation of a communication device which operates by a power supply from a battery unit charged by a battery charger, comprising:

estimating intra-device temperature after a predetermined setup time after starting charging on the basis of current intra-device temperature and a current service state of the communication device, and controlling charging of the battery unit on the basis of the intra-device temperature after the predetermined setup time estimated wherein said current service state of the communication device is determined from at least a detected voltage and a consumption current.

17. The method of controlling heat generation of a communication device according to claim 16, further comprising:

checking whether a device using function is changed, and estimating intra-device temperature after the predetermined setup time after the device using function is changed if the device using function is changed after the second step.

18. The method of controlling heat generation of a communication device according to claim 16, further comprising:

repeatedly estimating intra-device temperature after the predetermined setup time whenever the predetermined setup time elapses after estimating the intra-device temperature after the predetermined setup time.

19. The method of controlling heat generation of a communication device according to claim 16, further comprising:

if the device is using at least one of predetermined functions, determining an estimated time on the basis of a setup time which corresponds to the predetermined function which the device is using, and estimating intra-device temperature after the estimated time after starting charging, or after the device using function is changed.

20. A communication device which operates by a power supply from a battery unit charged by a battery charger, comprising:

a temperature monitor operable to estimate future intra-device temperature on the basis of present intra-device temperature and a present service state of the communication device; and a charge controller operable to control charging of the battery unit on the basis of the future intra-device temperature estimated by the temperature monitor;

wherein said present service state of the communication device is determined from at least a detected voltage and a consumption current.

* * * * *